United States Patent
Hirose

(10) Patent No.: US 9,153,366 B2
(45) Date of Patent: Oct. 6, 2015

(54) RESISTOR AND RESISTANCE ELEMENT

(71) Applicant: MURATA MANUFACTURING CO., LTD., Nagaokakyo-shi, Kyoto-fu (JP)

(72) Inventor: Sakyo Hirose, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/034,726

(22) Filed: Sep. 24, 2013

(65) Prior Publication Data

US 2014/0085044 A1    Mar. 27, 2014

Related U.S. Application Data

(63) Continuation of application No. PCT/JP2012/057260, filed on Mar. 22, 2012.

(30) Foreign Application Priority Data

Mar. 28, 2011   (JP) ................... 2011-069819

(51) Int. Cl.
  *H01C 7/00*   (2006.01)
  *H01C 7/18*   (2006.01)
  *H01C 7/04*   (2006.01)
  *H01C 17/12*  (2006.01)
  *G01K 7/22*   (2006.01)

(52) U.S. Cl.
  CPC .. *H01C 7/18* (2013.01); *G01K 7/22* (2013.01); *H01C 7/006* (2013.01); *H01C 7/047* (2013.01); *H01C 17/12* (2013.01)

(58) Field of Classification Search
  CPC .......... H01C 7/006; H01C 7/047; H01C 7/18; H01C 17/12

USPC ................... 338/13, 15, 18, 22 SD, 24, 25
See application file for complete search history.

(56) References Cited

U.S. PATENT DOCUMENTS 3,936,790 A * 2/1976 Eastwood et al. ............ 338/25
5,602,393 A * 2/1997 Gerard ..................... 250/338.4

(Continued)

FOREIGN PATENT DOCUMENTS

| | | |
|---|---|---|
| JP | 2786151 B2 | 8/1998 |
| JP | 10-270217 | 10/1998 |
| JP | 2000-143243 A | 5/2000 |

OTHER PUBLICATIONS

Keisuke Shibuya, Masashi Kawasaki, and Yoshinori Tokura, "Metal-insulator transition in epitaxial V1-xWxO2 (0 ≤ x ≤ 0.33) thin films", Applied Physics Letters 96, 022102 (2010).

(Continued)

*Primary Examiner* — Kyung Lee
(74) *Attorney, Agent, or Firm* — Arent Fox LLP

(57) ABSTRACT

A resistance element that includes a resistor made of a thin film containing $VO_2$ as a main component and at least one of W, Nb, Mo and Ti as an additive element. The thin film has a plurality of layer regions distributed in the direction of thickness thereof, and amounts of the additive elements doped in the layer regions are different from each other between the adjacent layer regions. Terminal electrodes are disposed such that a current flows through the plural layer regions of the resistor. Preferably, an interval at which the plural layer regions are distributed is selected to be not less than 8 nm and not more than 35 nm.

8 Claims, 5 Drawing Sheets

(56) References Cited

U.S. PATENT DOCUMENTS

| | | | |
|---|---|---|---|
| 5,801,383 A * | 9/1998 | Wada et al. | 250/332 |
| 5,820,995 A * | 10/1998 | Niimi | 428/469 |
| 5,900,799 A * | 5/1999 | Morris | 338/18 |
| 6,489,613 B1 * | 12/2002 | Mori et al. | 250/338.1 |
| 6,943,660 B2 * | 9/2005 | Bower et al. | 338/47 |
| 7,508,077 B2 * | 3/2009 | Watanabe et al. | 257/763 |
| 7,709,922 B2 * | 5/2010 | Takagi et al. | 257/467 |
| 8,344,845 B2 * | 1/2013 | Radamson | 338/22 SD |
| 2009/0011677 A1 * | 1/2009 | Ikeda et al. | 445/24 |
| 2009/0206979 A1 * | 8/2009 | Tepper et al. | 338/115 |
| 2011/0080631 A1 * | 4/2011 | Moon et al. | 359/288 |

OTHER PUBLICATIONS

PCT/JP2012/057260 Written Opinion dated Jun. 19, 2012.

* cited by examiner

RESISTOR AND RESISTANCE ELEMENT

CROSS REFERENCE TO RELATED APPLICATIONS

The present application is a continuation of International application No. PCT/JP2012/057260, filed Mar. 22, 2012, which claims priority to Japanese Patent Application No. 2011-069819, filed Mar. 28, 2011, the entire contents of each of which are incorporated herein by reference.

FIELD OF THE INVENTION

The present invention relates to a resistor and a resistance element, and more particularly to a resistor made of a thin film containing vanadium oxide ($VO_2$) as a main component, and a resistance element constituted using the resistor.

BACKGROUND OF THE INVENTION

Recently, there have increased needs for sensors for sensing the fever generated with influenza, high-performance infrared sensors used as, e.g., human presence sensors and non-contact temperature sensors, and high-performance strain sensors. Furthermore, using $VO_2$ in those sensors has been studied. $VO_2$ is a material exhibiting such characteristics of a CTR (Critical Temperature Resistor) that resistance abruptly lowers at a certain temperature. Tungsten (W), niobium (Nb), molybdenum (Mo), titanium (Ti), etc. are doped for control of the metal-insulator transition temperature.

However, although the non-doped $VO_2$ exhibits an abrupt a resistance change at about 70° C., a temperature range where the resistance abruptly changes is very narrow. Accordingly, even when the non-doped $VO_2$ is employed in a sensor, the sensor is just usable in an extremely limited temperature range. For that reason, an improvement of making the resistance changeable over a wide temperature range is required in order that the non-doped $VO_2$ can be employed in a wide variety of sensors.

In view of the above-mentioned situations, a thin film of $VO_2$ has been improved by not only doping impurities as described above, but also utilizing strain generated in a substrate, or introducing oxygen defects. However, those methods for improving resistance characteristics are very difficult to control, and raise the problem that the thin film of $VO_2$ cannot be stably produced. For example, the $VO_2$ thin film containing many oxygen defects has the problem that its resistance moderately changes near a room temperature, while a resistance change rate is small and control is difficult to obtain the desired characteristics. In order that the sensor can satisfactorily operate at an optionally selected temperature, e.g., a room temperature, it is demanded to realize a resistor exhibiting a large resistance change rate at the optionally selected temperature over a wider temperature range thereabout.

In relation to the above-described problems, Patent Document 1 discloses a thin film of vanadium oxide in which, assuming the vanadium oxide to be expressed by $VO_x$, a range of x satisfies $1.875<x<2.0$. According to the technique disclosed in Patent Document 1, a moderate resistance change depending on temperature can be realized over a wide temperature range by suppressing the metal-insulator transition specific to $VO_2$, and higher CTR characteristics than those of the known $TiO_x$ can be realized.

The technique disclosed in Patent Document 1 is effective when trying to realize sensing with an infrared ray over a wide temperature range. However, the disclosed technique accompanies with the problem that, because a resistance change corresponding to a temperature change is small, a difficulty arises in sensing a small temperature change or a small intensity change of the infrared. Therefore, any additional expedient, such as adding an amplification circuit, is required on the circuit side.

Furthermore, when the sensor is used as a human presence sensor operating near the room temperature or as a temperature sensor in a refrigerator, a temperature range where the sensor is used is limited to a certain range, and the sensor is not needed to be usable over an excessively wide temperature range. In such a case, the resistance is desirably changed to a large extent in a relatively narrow temperature range (e.g., 20° C.) about a midpoint temperature. Stated in another way, it is desired that the sensor exhibits a resistance change as large as possible not only at the optionally selected temperature, but also over the optionally selected temperature range thereabout.

On the other hand, Non Patent Document 1 states that the metal-insulator transition temperature of the $VO_2$ thin film can be controlled by doping tungsten as an impurity. Thus, the doping of tungsten causes a tendency to lower the transition temperature, to reduce the resistance change rate attributable to the metal-insulator transition, and to make the metal-insulator transition slightly moderated. In other words, the resistance is more moderately changed with the temperature change. Accordingly, by doping tungsten in a larger amount, it is possible to reduce temperature dependency and to widen a working temperature range.

However, the technique disclosed in Non Patent Document 1 has the problem that, because the resistance change rate reduces and the transition temperature lowers, the resistance change cannot be increased over a certain temperature range about an optionally selected temperature.

Patent Document 1: Japanese Patent No. 2786151
Non Patent Document 1: Keisuke Shibuya, Masashi Kawasaki, and Yoshinori Tokura, "Metal-insulator transition in epitaxial $V_{1-x}W_xO_2$ ($0 \leq x \leq 0.33$) thin films", APPLIED PHYSICS LETTERS 96, 022102 (2010)

SUMMARY OF THE INVENTION

An object of the present invention is to provide a resistor which exhibits a large resistance change rate at a temperature, which can be optionally selected with relatively high flexibility, over a certain temperature range thereabout.

Another object of the present invention is to provide a resistance element constituted using the resistor.

The present invention addresses a resistor made of a thin film containing $VO_2$ as a main component and at least one of W, Nb, Mo and Ti as an additive element. To solve the technical problems described above, the present invention is featured in that the thin film has a plurality of layer regions distributed in a direction of thickness thereof, and amounts of the additive elements doped in the plural layer regions are different from each other between the adjacent layer regions.

Preferably, an interval at which the plural layer regions are distributed is not less than 8 nm and not more than 35 nm.

The resistor according to the present invention may be practiced in a first form that one of the layer regions in which the amounts of the additive elements doped therein are different from each other contains the additive element, and the other does not contain the additive element, or in a second form that one of the layer regions in which the amounts of the additive elements doped therein are different from each other contains the additive element in a comparatively large amount, and the other contains the additive element in a comparatively small amount.

The present invention further addresses a resistance element constituted using the resistor described above. Thus, the resistance element according to the present invention includes the resistor according to the present invention, and at least two terminal electrodes disposed on the resistor such that a current flows through the plural layer regions.

With the resistor according to the present invention, a temperature range where resistance changes to a large extent can be widened while a large resistance change rate is maintained over a temperature range from a room temperature to about 70° C. Therefore, when the resistance element according to the present invention is constituted using the above-mentioned resistor, a small temperature change or a small change of infrared intensity can be detected over a certain temperature range about an arbitrary temperature within the temperature range from the room temperature to about 70° C.

The principles why the above-mentioned advantageous effects can be obtained are still not yet clarified in not a few points, but the reasons inferable at present are as follows. A current flows through a plurality of paths, such as flowing not only across the plural layer regions in which temperature dependency of resistance is different, but also along each of the layer regions. Therefore, the temperature dependency of resistance is moderated. Thus, looking at the resistor on the whole, the temperature range where the resistance changes to a large extent can be widened while a large resistance change rate is maintained.

As known hitherto, the transition temperature at which resistance greatly changes can be controlled by changing the specie of an impurity doped in $VO_2$ and/or an amount of the doped impurity. Taking into account that idea, a resistance element capable of providing a comparatively wide temperature range where resistance changes to a large extent about an arbitrary temperature, can be realized by constituting a resistor in accordance with the present invention while optionally selecting the specie of the doped impurity and/or the amount of the doped impurity, which are adapted respectively for various application devices, such as a bolometer used at a room temperature and a non-contact temperature sensor disposed in a refrigerator.

By selecting the interval at which the plural layer regions are distributed, i.e., a thickness of each of the plural layer regions, to be not less than 8 nm and not more than 35 nm, the temperature range where the resistance changes to a large extent can be widened in comparison with that in the case where the distribution interval is outside the above-mentioned range.

BRIEF DESCRIPTION OF THE DRAWINGS

FIGS. 4(A) and 4(B) are graphs representing temperature dependency of resistance and the B constant of Sample 1 obtained as an experiment example, in which FIG. 4(B) represents the graph in scale enlarged in the direction of a horizontal axis indicating temperature than in FIG. 4(A).

FIGS. 5(A) and 4(B) are graphs representing temperature dependency of resistance and the B constant of Sample 4 obtained as an experiment example, in which

FIGS. 6(A) and 4(B) are graphs representing temperature dependency of resistance and the B constant of Sample 5 obtained as an experiment example, in which

DETAILED DESCRIPTION OF THE PREFERRED EMBODIMENTS

Figure 1:
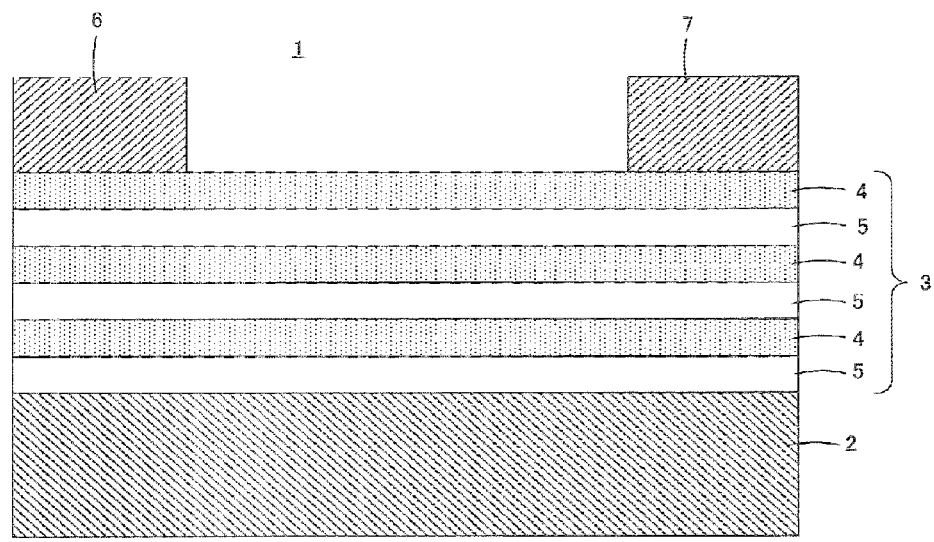
FIG. 1 is a sectional view illustrating a resistance element 1 according to a first embodiment of the present invention.

A resistance element 1 according to a first embodiment of the present invention will be described below with reference to FIG. 1.

The resistance element 1 includes a substrate 2. For example, a sapphire substrate is advantageously used as the substrate 2. A resistor 3 made of a thin film is formed on the substrate 2, and the thin film is formed by the RF sputtering process, for example.

The thin film constituting the resistor 3 contains $VO_2$ as a main component and at least one of W, Nb, Mo and Ti as an additive element. The thin film has a plurality of layer regions 4, 5, 4, 5, 4, ..., which are distributed in the direction of thickness thereof, and amounts of the doped additive elements are made different from each other between the first layer region 4 and the second layer region 5, which are adjacent to each other. Thus, between the adjacent layer regions, the metal-insulator transition temperature is different, and hence temperature dependency of resistance is also different.

For example, the first layer region 4 is made of non-doped $VO_2$, and the second layer region 5 is made of $VO_2$ doped with at least one of the above-mentioned additive elements. Alternatively, the first and second layer regions 4 and 5 are each made of $VO_2$ doped with at least one of the above-mentioned additive elements, and the amount of the doped additive element is set to be larger in the second layer region 5 than in the first layer region 4.

When the first layer region 4 is made of non-doped $VO_2$ and the second layer region 5 is made of $VO_2$ containing the additive element, the thin film constituting the resistor 3 is formed as follows, for example, using the RF sputtering process.

A vanadium metal and an additive element, each having high purity and serving as a target, are prepared. The substrate 2 is also prepared and placed in a sputtering apparatus. Thereafter, film formation by sputtering is carried out by intermittently opening and closing a cathode shutter on the additive element side at intervals of a predetermined time while a cathode shutter on the vanadium target side is always kept in an open state. As a result, the first layer region 4 made of non-doped $VO_2$ is formed in a period of the film forming process during which the cathode shutter on the additive element side is closed, and the second layer region 5 made of $VO_2$ containing the additive element is formed in a period of the film forming process during which the cathode shutter on the additive element side is opened.

Respective thicknesses of the first and second layer regions 4 and 5 can be changed by controlling the time intervals at which the cathode shutter on the additive element side is controlled to be opened and closed.

As seen from experiment examples described later, an interval at which the plural layer regions 4 and 5 are distributed is preferably not less than 8 nm and not more than 35 nm.

When the first and second layer regions 4 and 5 are each made of $VO_2$ doped with the additive element and the amount of the doped additive element is set to be larger in the second layer region 5 than in the first layer region 4, the first and second layer regions 4 and 5 can be formed by, in the film forming process, changing an opening degree of the cathode shutter on the additive element side at intervals of a predetermined time, or changing an amount of RF electric power on the additive element side at intervals of a predetermined time, while the cathode shutter on the vanadium target side and the cathode shutter on the additive element side are both always kept in an open state.

Two terminal electrodes 6 and 7, for example, are disposed on an upper surface of the resistor 3. The two terminal electrodes 6 and 7 are positioned in opposite end portions of the resistor 3. It is to be noted that, in FIG. 1, the resistor 3 is illustrated in an enlarged scale in the direction of thickness thereof, and an actual thickness of the resistor 3 is about several tens to several hundreds nanometers. Accordingly, a current flowing between the terminal electrodes 6 and 7 flows through a plurality of paths not only across the plural layer regions 4, 5, 4, 5, 4, . . . , but also along the layer regions 4 and 5.

The terminal electrodes 6 and 7 are each made of a Pt thin film, for example. The Pt thin film can be formed by the DC sputtering process using a metal mask.

With the resistance element 1 having the above-described structure, a resistance change of the resistor 3 depending on a temperature change can be measured based on a change of the current flowing between the terminal electrodes 6 and 7. Stated in another way, the resistance element 1 can detect a temperature change or a change of infrared intensity based on the above-mentioned current change.

Furthermore, with the resistance element 1, a temperature range where the resistance changes to a large extent can be widened while a large resistance change rate is maintained. The reason is inferably as follows. As described above, the temperature dependency of resistance is different between the first layer region 4 and the second layer region 5, and a current flowing in the resistor 3 flows through a plurality of paths not only across both the first and second layer regions 4 and 5 in which the temperature dependency of resistance is different from each other, but also along each of the layer regions 4 and 5. Therefore, the temperature dependency of resistance is moderated. As a result, looking at the resistor 3 on the whole, the temperature range where the resistance changes to a large extent can be widened while a large resistance change rate is maintained.

In the resistor 3 illustrated, the second layer region 5 is first positioned on the substrate 2, and the first layer region 4 is positioned on the second layer region 5. However, the order in which the first layer region 4 and the second layer region 5 are laminated may be reversed.

A resistance element 1a according to a second embodiment of the present invention will be described below with reference to FIG. 2. Constituent elements in FIG. 2 corresponding to those illustrated in FIG. 1 are denoted by the same reference signs, and duplicate description of those constituent elements is omitted.

Figure 2:
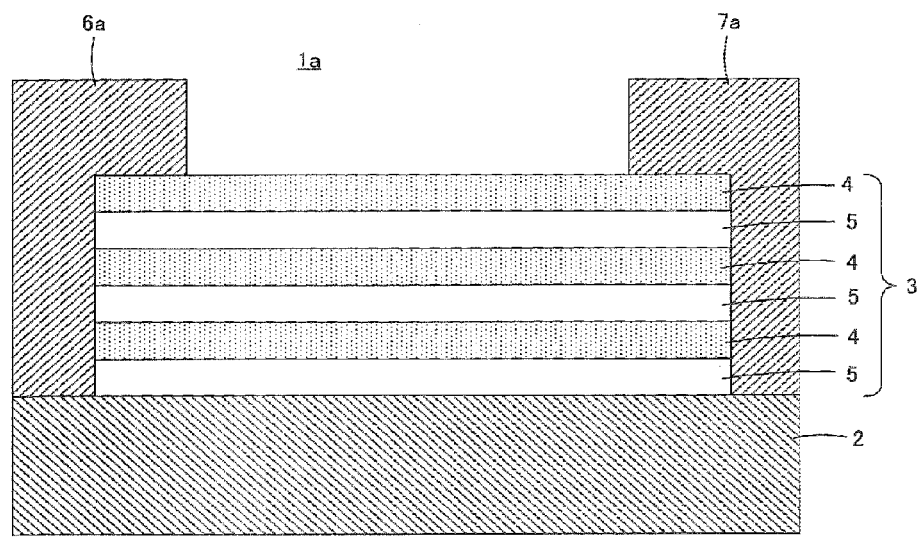
FIG. 2 is a sectional view illustrating a resistance element 1a according to a second embodiment of the present invention.

The resistance element 1a, illustrated in FIG. 2, is different from the resistance element 1, illustrated in FIG. 1, in positions where terminal electrodes 6a and 7a are formed. The terminal electrodes 6a and 7a are formed to extend from the upper surface of the resistor 3 so as to cover opposite end surfaces thereof. The other structure and operating function are similar to those in the resistance element 1 illustrated in FIG. 1.

Experiment examples carried out with intent to confirm the advantageous effects of the present invention will be described below.

EXPERIMENT EXAMPLES

A thin film containing vanadium oxide ($VO_2$) as a main component was formed using the RF sputtering process. As one target, a vanadium (V) target made of vanadium metal (V) with high purity (3N) was prepared. On the other hand, tungsten (W) was selected as the additive element for temperature control, and a tungsten (W) target was prepared as another target. Moreover, a sapphire substrate (C-cut) was used as the substrate.

Film formation was carried out in an RF sputtering apparatus by holding the substrate at temperature of 500° C. with a lamp heating mechanism, introducing argon at 24 sccm and oxygen at 1 sccm after confirming that the backpressure was not higher than $1 \times 10^{-4}$ Pa, and controlling a vacuum level to 0.28 Pa.

In the film forming process described above, for Samples 3 to 8 representing the examples falling within the scope of the present invention, the amount of RF electric power was fixedly set to 80 W and 10 W for the V target and the W target, respectively, as listed in Table 1 given later. A distance from the substrate to the target was set to 80 mm and 140 mm for the V target and the W target, respectively. The film formation was carried out by, after start of the film forming operation, intermittently opening and closing the cathode shutter on the W target side at intervals of a time indicated in each of columns "Interval Time" in Table 1, while the cathode shutter on the V target side was always kept in an open state. A total time of the film forming operation was set to 120 minutes.

As a result of the film forming operation described above, a resistor made of a thin film was formed on the substrate, the thin film having a sectional structure in which the first layer region made of non-doped $VO_2$ and the second layer region made of $VO_2$ containing W were alternately laminated. It was confirmed with the aid of X-ray diffraction that the formed thin film was a single-phase $VO_2$ thin film and it was an epitaxially grown film.

Meanwhile, for Sample 1 representing a comparative example departing from the scope of the present invention, the film formation was carried out by setting a value in column "RF power" of "W target" to 0 W, as indicated in Table 1, such that an entire region of the thin film was formed in the same composition as that in the first layer region made of non-doped $VO_2$ in Samples 3 to 8.

For Sample 2 representing another comparative example departing from the scope of the present invention, the film formation was carried out by setting a value in column "RF power" of "W target" to 5 W, as indicated in Table 1, while the cathode shutter on the W target side was always kept in an open state, such that an entire region of the thin film was formed in the same composition as that in the second layer region made of W-doped $VO_2$ in Samples 3 to 8.

Figure 3:
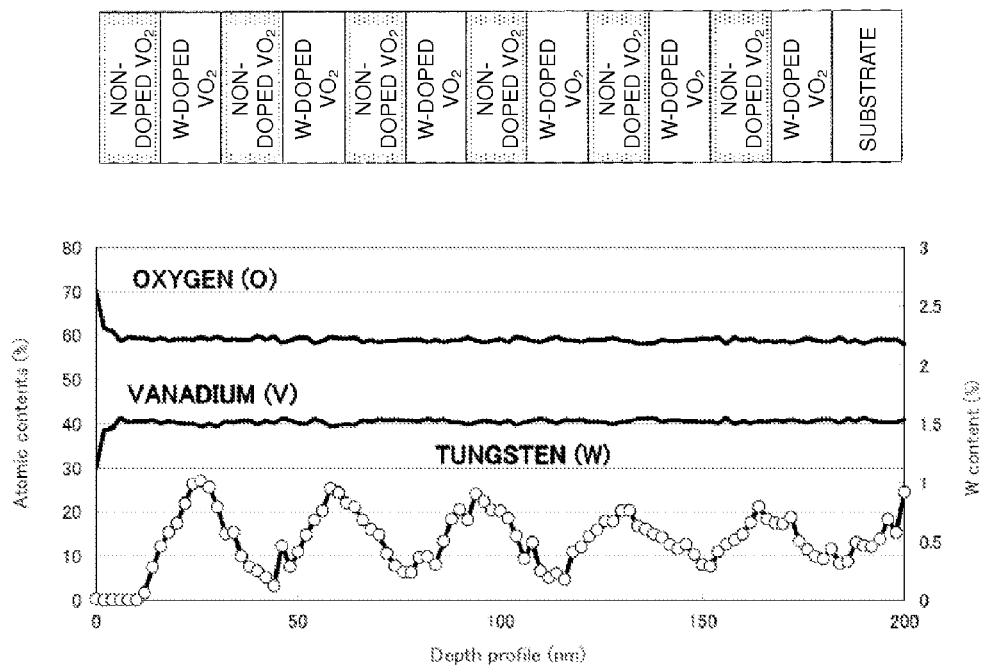
FIG. 3 illustrates a section of a resistor made of a thin film, which corresponds to Sample 5 obtained as an experiment example, along with a graph representing a distributed state of respective atomic contents of vanadium (V), oxygen (O), and tungsten (W) in corresponding relation to a sectional view, the contents being changed in the direction of depth of the thin film from the surface thereof.

Among thus-obtained Samples 1 to 8, for Sample 5 obtained by intermittently opening and closing the cathode shutter on the W target side at intervals of 10 minutes, FIG. 3 illustrates a section of the thin film along with a graph representing a distributed state of respective atomic contents of vanadium (V), oxygen (O), and tungsten (W) in corresponding relation to the sectional view.

The contents of V, O and W, illustrated in FIG. 3, were measured using an XPS (X-ray Photoemission Spectroscopy) while the thin film was subjected to Ar etching from its surface. By intermittently opening and closing the cathode shutter, the thin film is ideally formed such that a non-doped $VO_2$ layer, which is not doped with W, and a W-doped $VO_2$ layer are alternately laminated as illustrated in an upper stage in FIG. 3. In fact, however, as seen from the result measured using the XPS, the contents of V and O are substantially constant, while the content of W varies such that a region where the content of W is comparatively small and a region where the content of W is comparatively large appear alternately.

The reasons why the W content obtained with the XPS do not exhibit, as mentioned above, such a sharp distribution as illustrated in the upper stage of FIG. 3 inferably reside in that the depth resolution of the XPS is about several nanometers, that the resolution gradually degrades with generation of irregularities as the etching proceeds into a deeper region, and that diffusion of W slightly occurs from the layer in which W has been doped during the film formation toward the layer in which W is not doped. However, it is at least proved that the layer region where the W content is comparatively large and the layer region where the W content is comparatively small are formed alternately as expected prior to conducting the measurement.

Column "Thickness of Each Layer" in Table 1 indicates, for Samples 3 to 8, a thickness of each of the non-doped $VO_2$ layer and the W-doped $VO_2$ layer, more precisely a distribution interval of the plural layer regions including the first layer region where the W content is comparatively small and the second layer region where the W content is comparatively large, the second layer region being adjacent to the first layer region. For Samples 1 and 2, the column "Thickness of Each Layer" indicates a thickness of the entire thin film constituting the resistor.

Next, two terminal electrodes made of Pt and having a thickness of about 300 nm and a square size of 0.5 mm were formed on the resistor made of the thin film, which was obtained as each of Samples, in the form illustrated in FIG. 1 by the DC sputtering process using a metal mask.

On a resistance element obtained as described above for each of Samples, a characteristic test was carried out as follows.

The resistance of the resistance element was measured by the 2-terminal method using a temperature variable pullover provided with a temperature heating mechanism of the Joule-Thompson type, while temperature was raised at a rate of 2 K/minute from a lowermost level. The B constant, i.e., an index representing an extent of resistance change caused with a change of temperature, was calculated from the measured temperature dependency of resistance by employing the following formula.

$$B \text{ constant} = \ln(R_1/R_2)/(1/T_1 - 1/T_2)$$

In the above formula, $R_1$ and $R_2$ denote resistance values [Ω] measured at temperature $T_1$ and $T_2$ [K], respectively. As seen from the above formula, the B constant increases with the resistance element exhibiting a larger resistance change.

Figure 4A:
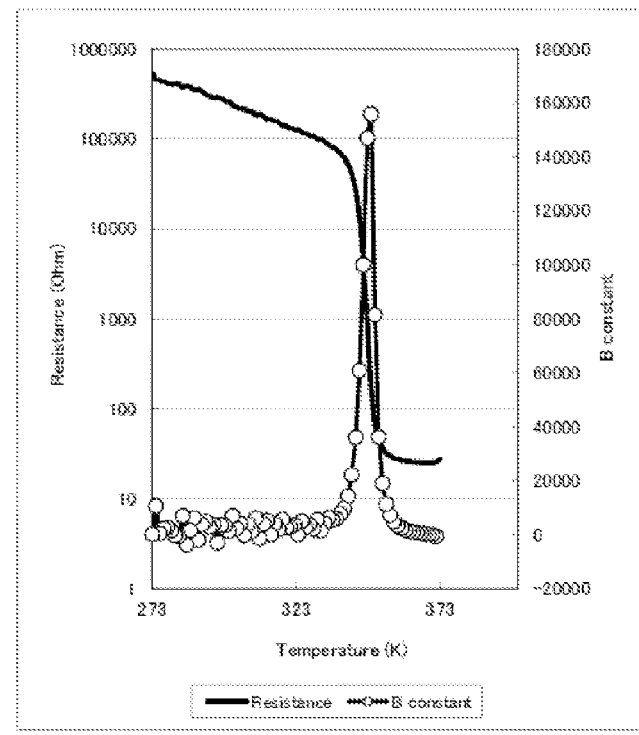
Figure 4B:
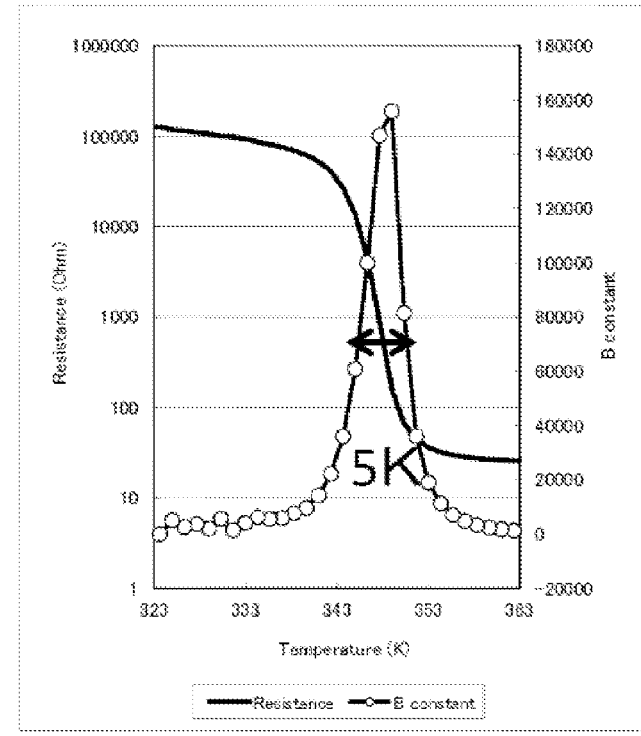
Figure 5A:
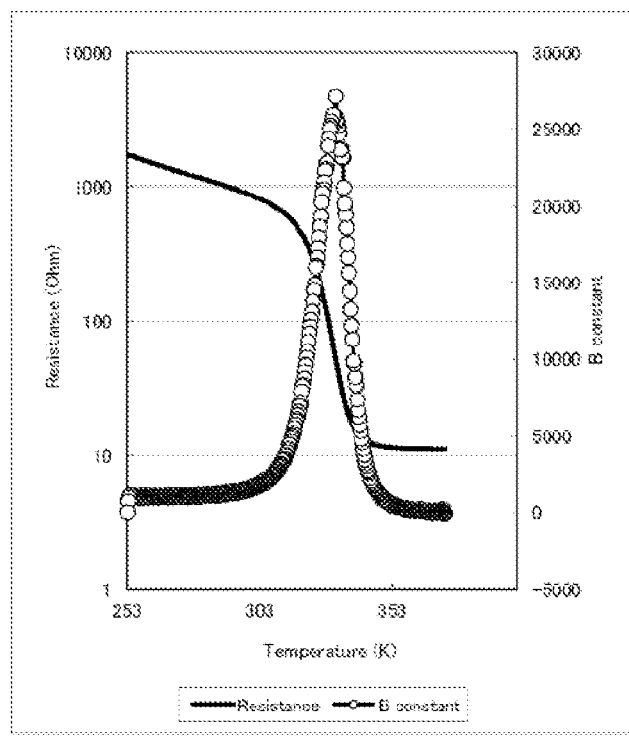
Figure 5B:
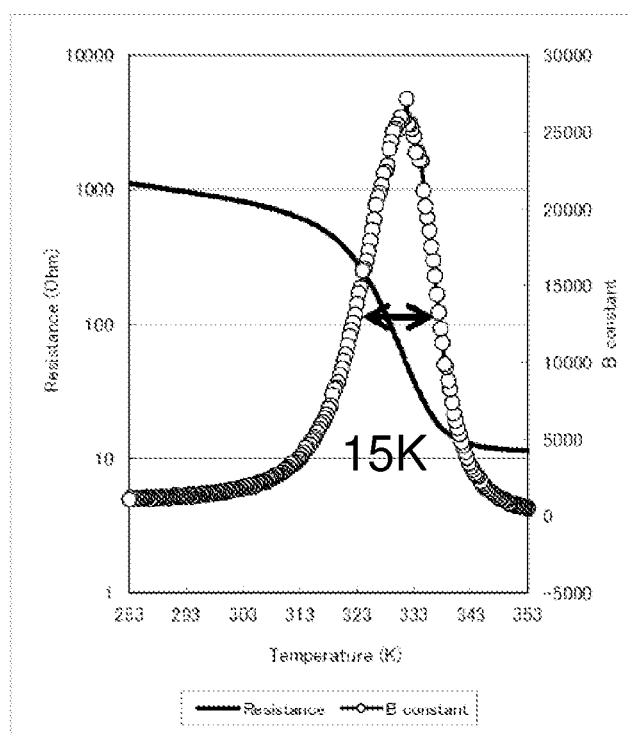
FIG. 5(B) represents the graph in scale enlarged in the direction of a horizontal axis indicating temperature than in FIG. 5(A).
Figure 6A:
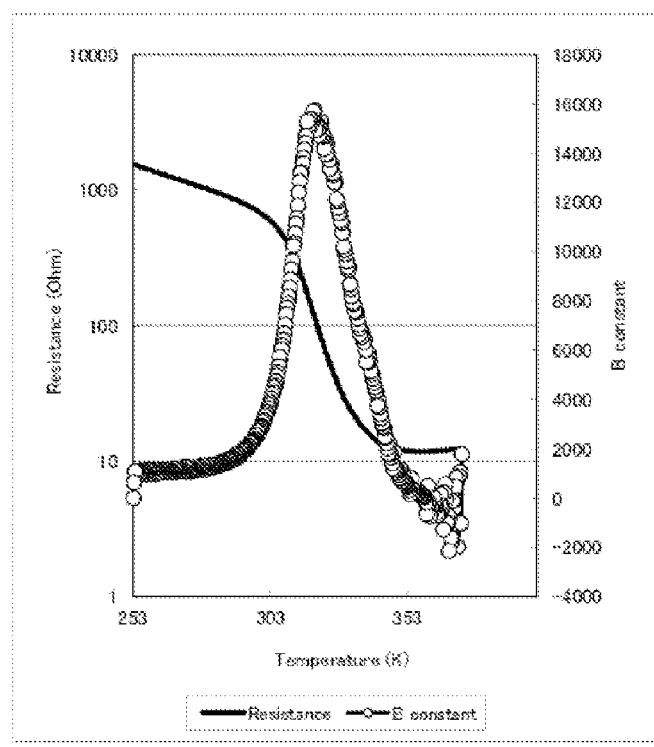
Figure 6B:
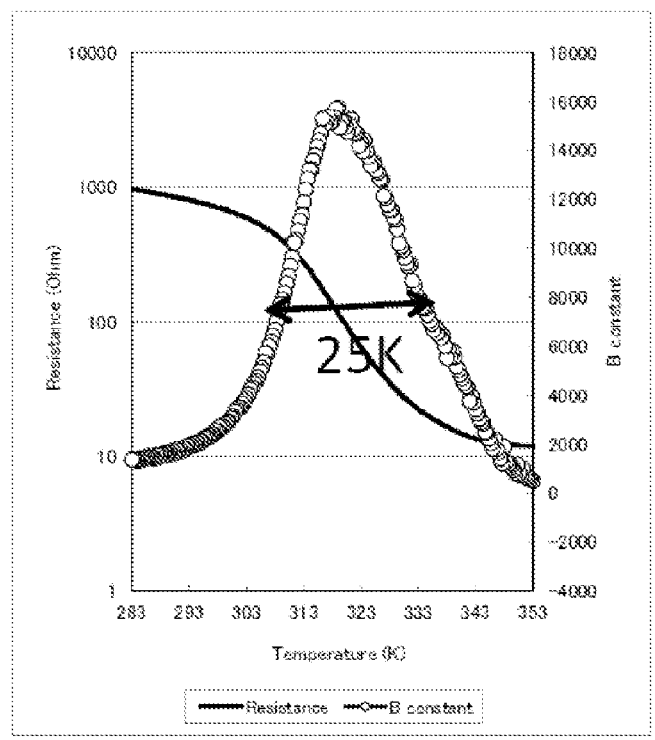
FIG. 6(B) represents the graph in scale enlarged in the direction of a horizontal axis indicating temperature than in FIG. 6(A).

FIGS. 4(A) and 4(B) represent the temperature dependency of resistance and the B constant of Sample 1 including the resistor made of the non-doped $VO_2$ thin film. As seen from FIGS. 4(A) and 4(B), Sample 1 exhibits the CTR characteristics that the resistance abruptly reduces at temperature of about 350K. The B constant takes a maximum value at temperature of about 350K, and its value is small in temperature regions higher and lower than 350K.

A temperature $T_{max}$ at which the B constant was maximized, and a temperature difference ΔT between two points at which the B constant reduced to a half of the maximum value were determined. As a result, $T_{max}$ was about 349K and ΔT was about 5K in the case of Sample 1. The result of ΔT being "5K" is also indicated in FIG. 4(B). From the value of ΔT, it is understood that, in Sample 1, the resistance abruptly changes only in a very narrow temperature range.

For other Samples as well, $T_{max}$ and ΔT were determined in a similar manner. The determined results are listed in respective columns "$T_{max}$" and "ΔT" in Table 1.

TABLE 1

| Sample No. | V Target RF Power | W Target RF Power | Interval Time | Thickness of Each Layer | Tmax | ΔT |
|---|---|---|---|---|---|---|
| 1 | 80 W | 0 W | — | 200 nm | 349 K | 5 K |
| 2 | 80 W | 5 W | — | 200 nm | 333 K | 7 K |
| 3 | 80 W | 10 W | 2 min | 3 nm | 333 K | 13 K |
| 4 | 80 W | 10 W | 5 min | 8 nm | 331 K | 15 K |
| 5 | 80 W | 10 W | 10 min | 17 nm | 322 K | 25 K |
| 6 | 80 W | 10 W | 15 min | 25 nm | 319 K | 28 K |
| 7 | 80 W | 10 W | 20 min | 35 nm | 322 K | 32 K |
| 8 | 80 W | 10 W | 30 min | 50 nm | 325 K | 14 K |

As seen from Table 1, in Samples 3 to 8 falling within the scope of the present invention, i.e., in the resistance elements each including the resistor which contains $VO_2$ as a main component and an impurity additively doped therein for control of the transition temperature, and in which layer regions having impurity doped concentrations different from each other are alternately laminated, the temperature range "ΔT" where the resistance changes to a large extent (namely, where the B constant is large) can be obtained as 13K or wider while the temperature "Tmax" at which the B constant takes a maximum value is set to about 325K.

On the other hand, in Sample 1 departing from the scope of the present invention, the temperature range "ΔT" is narrow, i.e., 5K, as described above. Furthermore, in Sample 2 containing W uniformly doped in the same W content over the entirety of the thin film that constitutes the resistor 3, the temperature range "ΔT" is narrow, i.e., 7K.

In order to find a preferable range of the distribution interval between the layer regions where the W contents are different from each other, i.e., of the "Thickness of Each Layer" in Table 1, comparative evaluation is made below among Samples 3 to 8 falling within the scope of the present invention.

FIGS. 5(A) and 5(B) and FIGS. 6(A) and 6(B) respectively represent the temperature dependency of resistance and the B constant of Samples 4 and 5 falling within the scope of the present invention, respectively. The maximum value of the B constant is about 26000 in Sample 4 illustrated in FIGS. 5(A) and 5(B) and is larger than that in Sample 5, i.e., about 16000. However, the resistance at temperature of 283K and the resistance at temperature of 353K are substantially equal to each other between Samples 4 and 5.

Samples 4 and 5 are different in that the "interval time" in Table 1 is 5 minutes and 10 minutes, respectively. With such a difference, the "Thickness of Each Layer" takes 8 nm and 17 nm in Samples 4 and 5, respectively. As a result, as seen from Table 1, "ΔT" is 15K in Sample 4, whereas "ΔT" is widened to 25K in Sample 5. Moreover, in Samples 6 and 7, the "Thickness of Each Layer" is 25 nm and 35 nm, respectively, and "ΔT" is widened to 28K and 32K, respectively. On the other hand, in Sample 3 having the "Thickness of Each Layer" of 3 nm and Sample 8 having the "Thickness of Each Layer" of 50 nm, "ΔT" is narrowed to 13K and 14K, respectively, in comparison with those in Samples 4 to 7.

Thus, it is understood that, by varying "Thickness of Each Layer", the temperature range "ΔT" where the resistance changes to a large extent can be changed without substantially changing the resistance change rate, and that "ΔT" can be widened to 15K or more by setting the "Thickness of Each Layer" to be not less than 8 nm and not more than 35 nm as in Samples 4 to 7.

In the experiments described above, W is selected as the impurity for temperature control, and each Sample is fabricated such that "$T_{max}$" is about 325K. However, the transition temperature can also be changed by doping Mo, Nb or Ti instead of W. Furthermore, similar advantageous effects can be obtained with not only the case where the layer region made of non-doped $VO_2$ and the layer region made of $VO_2$ doped with the impurity for temperature control are alternately arranged, but also the case where the layer regions doped with the impurities in different amounts are alternately arranged.

REFERENCE SIGNS LIST 1, 1a resistance elements
3 resistor
4, 5 layer regions
6, 7, 6a, 7a terminal electrodes

The invention claimed is:

1. A resistor comprising:
a film containing vanadium dioxide as a main component and at least one of tungsten, niobium, molybdenum and titanium as an additive element,
wherein the film has a plurality of layer regions distributed in a thickness direction thereof, and an amount of the additive element doped in the plurality of layer regions is different between adjacent layer regions of the plurality of layer regions.

2. The resistor according to claim 1, wherein an interval at which the plurality of layer regions are distributed is not less than 8 nm and not more than 35 nm.

3. The resistor according to claim 1, wherein, among the adjacent layer regions, a first layer region contains the additive element and a second layer region does not contain the additive element.

4. The resistor according to claim 1, wherein, among the adjacent layer regions, a first layer region contains a larger amount of the additive element than a second layer region.

5. A resistance element comprising:
the resistor according to claim 1; and
at least two terminal electrodes disposed on the resistor such that a current flows through the plurality of layer regions.

6. The resistance element according to claim 5, further comprising a substrate, wherein a first surface of the resistor is adjacent the substrate and a second surface of the resistor is adjacent the at least two terminal electrodes.

7. The resistance element according to claim 5, wherein the at least two terminal electrodes are positioned at opposite end portions of the resistor.

8. The resistance element according to claim 7, wherein the at least two terminal electrodes further cover the opposite end portions of the resistor.

* * * * *